John R. Botterill
Franz Wienecke
INVENTORS

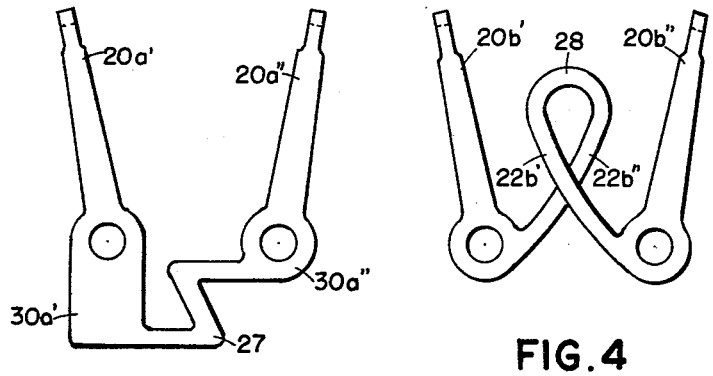
FIG. 3
FIG. 4
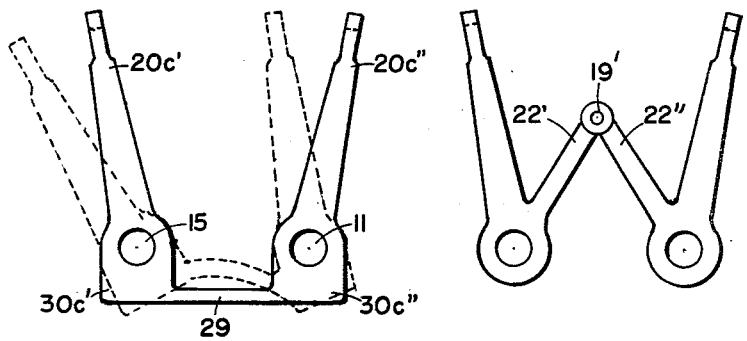
FIG. 5
FIG. 6
John R. Botterill
Franz Wienecke
INVENTORS
BY Mestern, Ross & Mestern
AGENTS

United States Patent Office 3,154,175
Patented Oct. 27, 1964

3,154,175
BRAKE-SHOE-RESTORING DEVICE
John R. Botterill, Dreieichenhain, and Franz Wienecke, Frankfurt am Main, Germany, assignors to Alfred Teves KG., Frankfurt am Main, Germany, a corporation of Germany
Filed Sept. 19, 1962, Ser. No. 224,773
Claims priority, application Germany Sept. 19, 1961
9 Claims. (Cl. 188—73)

Our present invention relates to a brake-shoe-restoring device and, more particularly, to means for restoring brake shoes of disk-type brakes to their inactive position upon actuation.

In general, this type of brakes comprises a support adjacent a brake disk and carrying a pair of brake shoes extending on opposite sides thereof. These shoes are provided with operating means for concurrently displacing them toward each other into engagement with the brake disk, thereby clamping same between the shoes and immobilizing the disk. Restoring devices of a known type are generally provided with a pair of flexible arms which resiliently bear on the respective brake shoes and are coupled by a web or bridge piece to which they are rigidly secured. The web has relatively little or no inherent elasticity and is generally rigid with the brake housing so that, when the free extremities of the restoring arms are drawn toward each other against the disk along with the brake shoes, a plastic deformation of the web results. Upon release of the brake shoes, the arms return only partially in a direction opposite to that of their initial displacement to alter the braking characteristics. Moreover, such restoring devices are characterized by difficulties in producing the two arms so that they have substantially identical elasticities and deformabilities. Such identity of elasticity and shape is necessary if the restoring force is to depend only upon the resiliency of the arms themselves and if the brake shoes are to be biased uniformly thereby.

It is an object of the present invention to provide a restoring device for a brake of the character described in which the above-mentioned disadvantages are avoided. A more particular object of the invention is to provide a relatively inexpensive but long-wearing restoring device for the brake shoes of disk-type brakes wherein uniformity of shape and elasticity of the arms of the device is not required.

These objects are attained, in accordance with the invention, in a restoring device comprising a pair of arms, each associated with a respective brake shoe, and pivot means individual to each of the arms, rotatably journaling them to the brake support. The arms are interconnected via a resilient bridge piece or web elastically deformable upon displacement of the arms toward each other in the course of actuation of the brake. Thus, the pivots articulating the arms to the brake support or housing may be provided substantially symmetrically on opposite sides of a median plane passing through the disk generally transversely to its axis while the bridge piece extends to opposite sides of the disk. It is important that the bridge piece be so shaped and/or constructed of such material that it is elastically deformed upon displacement of the arms whereby its inherent resilience serves to urge the arms back into their original positions without any tendency for them to alter these original positions.

According to a more specific feature of the invention, the arms are each provided with extensions projecting beyond their respective pivots in a direction opposite their free extremities which bear upon the brake shoes. Thus, the bridge piece can be integral with these extremities so that it joins them at a location offset from a straight line interconnecting the pivot points. Moreover, the bridge piece may be angular, looped or arcuate in order to afford a greater degree of elastic deformation. Advantageously, the web or bridge piece has such configuration that the spring force acting upon one of the arms upon bending thereof away from the disk is substantially less than the spring force acting upon the arms as a result of their mutual displacement toward each other and the disk. The displacement of one arm away from the other often occurs during the disk stroke, i.e. during displacement of one of the brake shoes toward the disk but prior to engagement therewith. It is desirable that the limit of proportionality of the resilient web and, consequently, the elasticity characteristics thereof, be so chosen that the limit is only exceeded upon displacement of the arms toward one another and is not approached upon displacement of one arm away from the disk.

The above and other objects, features and advantages of the present invention will become more readily apparent from the following description, reference being made to the accompanying drawing in which:

FIGS. 3–6 are plan views of restoring devices in accordance with other embodiments of the present invention.

Figure 1:
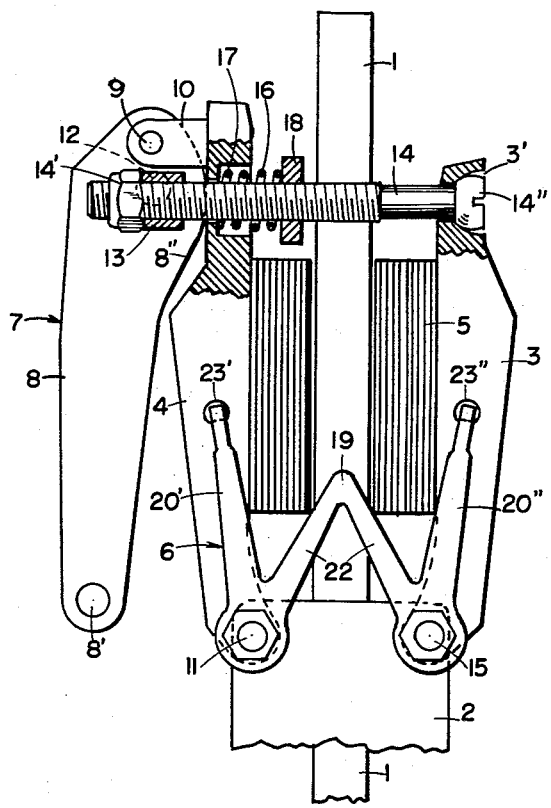
FIG. 1 is a side-elevational view, with parts broken away, of a disk brake provided with a restoring device in accordance with the present invention.
Figure 2:
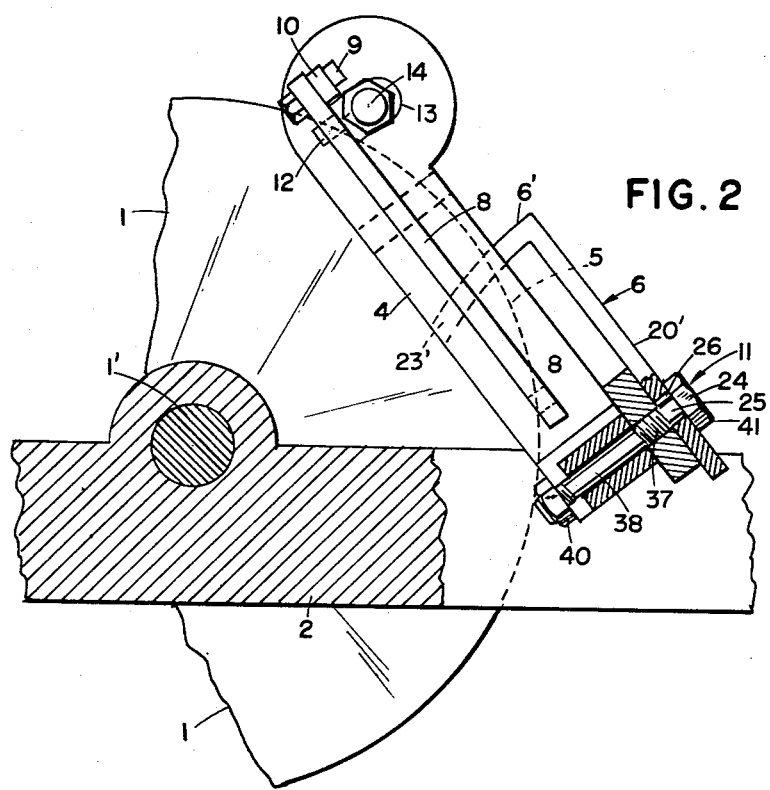
FIG. 2 is a plan view of the brake, partly in section, showing one pivot for the restoring device in greater detail.

In FIGS. 1 and 2 we show a disk brake comprising a disk 1 rigid with its shaft 1' (FIG. 2) journaled for rotation relatively to the brake support or housing 2. This support 2 carries a pair of brake shoes 3, 4 which are journaled to it at pivots 11, 15 for concurrent displacement toward and away from the disk 1. These brake shoes extend generally along chords of the disk and are provided with brake linings 5 frictionally engageable with the opposite surfaces of the disk. An actuating mechanism, generally designated 7, is provided for displacing the brake shoes while a restoring device 6 engages the shoes for biasing them against displacement by the actuating mechanism.

The actuating mechanism comprises a lever 8 which may be manually operated or mechanically coupled to remote-operating means via its eye 8' and is pivoted at its other extremity via a bolt 9 to a tab 10 upstanding from brake shoe 4. This lever is formed with arcuate camming surface 8" bearing upon the brake shoe 4 and carries a ring 13 swiveled thereto for rotation with a stud 12. A connecting rod 14 passes through this ring 13 and is threaded to receive a nut 14' against which the ring 13 is urged by the restoring device 6.

Rod 14 has a head 14" seated in a recess 3' of brake shoe 3 and extends generally parallel to the shaft 1' of the disk 1. An adjusting nut 18 is threadedly displaceable upon rod 14 and serves as one abutment for a coil spring 16 coaxial with the rod and received within a bore 17 in shoe 4. The spring bears against a shoulder 17' of this bore so that it serves to hold the cam surface 8" against the brake shoe 4. Upon displacement of the actuating lever 8 in a clockwise sense about its pivot 9, the brake shoe 4 is shifted in the direction of the disk 1 against the force of restoring means 6 while connecting rod 14 simultaneously draws the brake shoe 3 against the opposite side of the disk. Release of the actuating lever or its displacement in the opposite sense results in an outward displacement of the brake shoes to disengage their linings 5 from the braking surfaces of the disk. The brake stroke previously mentioned occurs when shoe 3 is drawn in the direction of the brake disk into abutment with the latter. During the course of this stroke, the arm of the restoring device 6 is displaced slightly away from the disk (FIG. 5).

The restoring device 6 shown in FIGS. 1 and 2 comprises a pair of arms 20', 20" whose free extremities are formed with L-shaped flanges 6' receivable in respective bores 23', 23" provided in the brake shoes 3, 4. Arms 20', 20" are pivoted to the brake housing 2 and are bridged by a web 22 integral with the arm and extending outwardly from the line connecting the pivots 11, 15. This web may be angular or V-shaped as shown in FIG. 1 and may extend generally in the direction of the free extremities of the arms so as to form a substantially planar W-shaped restoring member. The apex 19 may be formed by welding the two shanks of the bridge together or by any other means for joining them. It is, however, also possible to pivot the two shanks 22', 22" together at 19' as shown in FIG. 6 to obtain a similar result.

In FIG. 2 the pivot 11 is shown in greater detail. The pivot may comprise a stud 24 whose enlarged head 41 holds the restoring device 6 against the housing 2 but affords freedom of rotation for its arm 20'. The latter is provided with a bore 26 through which the shank 25 of stud 24 passes with peripheral clearance. A threaded portion 37 of this shank secures the stud to the brake housing 2 while an extension 38 thereof serves as a journal for the brake shoe 4 held thereon by a nut 40. The brake shoe 3 and arm 20" are similarly pivoted to the housing 2.

FIG. 3 shows another arrangement of the restoring device wherein arms 20a' and 20a" are formed with a Z-shaped web or bridge piece 27 joining together extensions 30a', 30a" of these arms.

FIG. 4 illustrates a variant wherein the arms 20b', 20b" are joined together by an arcuate bridge piece 28 integral with a pair of flexible extensions 22b', 22b" of these arms. The extensions each extend substantially parallel to the other arm and cross to afford a greater length of elastic web than is the case, for example, with the embodiment shown in FIGS. 1 and 6. The restoring elements of FIGS. 1, 3 and 4 are characterized by the fact that the movement of their arms toward one another effects elastic deformation beyond the proportionality limit while simple shifting of a single arm will only effect displacement of the other without substantial loading of the elastic web. Moreover, the configurations illustrated permit individual bending of each arm away from the other under somewhat lesser force than that tending to draw them together so that the proportionality limit is exceeded only upon displacement of the arms toward each other. These characteristics can also be obtained when the web has other configurations than the angular, looped or arcuate ones shown, e.g., when the web is bowed inwardly or outwardly. The loop arrangement shown in FIG. 4 as well as the arcuate arrangement previously described and the angular arrangement illustrated in FIGS. 1 and 3 are shown to be substantially coplanar although curvature or extension of the web in a plane perpendicular to the arms also proves satisfactory.

In FIG. 5 we show another arrangement, wherein the extensions 30c', 30c" of the arms 20c', 20c" are bridged by a substantially straight web 29 offset from, but parallel to, a line connecting the pivots 11 and 15 of these arms. Again in this embodiment the elastic characteristics of the restoring device are different upon displacement of the arms toward one another from those upon displacement of one of the arms during operation of the brake prior to contact of the shoes with the disk. During application of the brake against the disk the web 24 is deformed by tension while displacement of a single arm away from the disk results in a bending of the web as shown in dot-dash lines in FIG. 5. The elasticity curve of the material comprising the web is so chosen that under tension during braking the proportionality limit is exceeded while it is not reached upon deflection of one of the arms during the disk stroke.

The invention as illustrated and described is believed to admit of many modifications and variations readily apparent to persons skilled in the art and thus considered within the spirit and scope of the appended claims.

We claim:

1. In a disk brake, the combination with a support, a brake disk journaled for rotation relatively to said support, a pair of brake shoes each extending along one side of said disk and displaceably mounted on said support for joint movement toward and away from said disk, and actuating means for displacing said brake shoes toward and away from said disk, restoring means biasing said brake shoes away from said disk, said restoring means comprising a pair of arms each associated with a respective brake shoe and having an extremity in engagement therewith, pivot means individual to each of said arms articulating the latter to said support remote from the respective extremity, and a resiliently deformable web at least partly offset from a straight line interconnecting said pivot means bridging said arms for elastically urging them in a sense tending to maintain said brake shoes out of engagement with said disk.

2. The combination as defined in claim 1 wherein said web is formed with a pair of interconnected shanks extending from respective ones of said arms.

3. The combination as defined in claim 2 wherein said shanks are mutually inclined toward a median plane through said disk generally transverse to the axis thereof.

4. The combination as defined in claim 3 wherein said shanks are interconnected by an arcuate intermediate portion of said web forming a loop with said shanks.

5. The combination as defined in claim 3 wherein said shanks form a vertex at said median plane.

6. The combination as defined in claim 5 wherein said shanks are integrally connected at said vertex.

7. The combination as defined in claim 2 wherein said web is generally of Z-configuration.

8. The combination as defined in claim 1 wherein said arms are each provided with a respective extension projection beyond said pivot means and said deformable web interconnects said extremities while extending substantially parallel to said line.

9. The combination according to claim 1 wherein each of said brake shoes is pivotably secured to said support at a respective one of said pivot means.

References Cited in the file of this patent
FOREIGN PATENTS
1,207,766   France ---------------- Sept. 7, 1959